(12) United States Patent
Lahogue et al.

(10) Patent No.: US 8,991,588 B2
(45) Date of Patent: Mar. 31, 2015

(54) CHAIN CONVEYOR CHANGEABLE BETWEEN A STRETCHED CONFIGURATION AND A COMPACT CONFIGURATION

(71) Applicant: Sidel Participations, Octeville sur Mer (FR)

(72) Inventors: Yoann Lahogue, Octevillle sur Mer (FR); Laurent Danel, Octeville sur Mer (FR); Damien Cirette, Octeville sur Mer (FR); Caroline Bellec, Octeville sur Mer (FR); Franck Santais, Octeville sur Mer (FR); Isabelle Maillot, Octeville sur Mer (FR); Guy Feuilloley, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 13/733,986

(22) Filed: Jan. 4, 2013

(65) Prior Publication Data
US 2013/0192956 A1 Aug. 1, 2013

(30) Foreign Application Priority Data
Feb. 1, 2012 (FR) ...................................... 12 50933

(51) Int. Cl.
| | | |
|---|---|---|
| *B65G 37/00* | (2006.01) | |
| *B65G 17/32* | (2006.01) | |
| *B65G 17/20* | (2006.01) | |
| *B65G 23/30* | (2006.01) | |
| *B65G 47/28* | (2006.01) | |
| *B65G 47/84* | (2006.01) | |

(52) U.S. Cl.
CPC ................ *B65G 17/32* (2013.01); *B65G 47/28* (2013.01); *B65G 47/841* (2013.01); *B65G 17/20* (2013.01); *B65G 23/30* (2013.01)
USPC ................... 198/478.1; 198/474.1; 198/459.1

(58) Field of Classification Search
CPC ......... B65G 23/30; B65G 47/26; B65G 47/28
USPC ............... 198/459.8, 478.1, 379, 470.1, 792, 198/459.1, 474.1, 377.01–377.1
See application file for complete search history.

(56) References Cited

U.S. PATENT DOCUMENTS

| | | | | |
|---|---|---|---|---|
| 2,487,354 | A * | 11/1949 | McNamara et al. ...... | 198/377.01 |
| 3,269,516 | A * | 8/1966 | Lucas ....................... | 198/377.06 |
| 4,330,288 | A * | 5/1982 | Russell et al. ................ | 493/197 |
| 5,402,556 | A * | 4/1995 | Rutz ................................ | 26/73 |
| 5,871,079 | A * | 2/1999 | Nannini et al. ........... | 198/377.04 |
| 6,575,456 | B2 * | 6/2003 | Muller .......................... | 271/204 |
| 6,851,543 | B2 * | 2/2005 | Nakanishi ................... | 198/459.4 |

* cited by examiner

*Primary Examiner* — William R Harp
(74) *Attorney, Agent, or Firm* — Sughrue Mion, PLLC

(57) ABSTRACT

Conveyor for transporting articles such as a chain conveyor that can be changed between a stretched configuration and a compact configuration, the chain being formed from a plurality of articulated links. Each link includes a trolley provided with lateral guide mechanism cooperating with a track defining a predetermined trajectory, a support carrying a nozzle for the releasable attachment of an article, the support mounted rotatably with respect to the trolley between a straight position corresponding to the deployed configuration of the chain, and an oblique position, corresponding to the compact position of the chain and in which the support is inclined with respect to the straight position; and an actuator coupled to the support, capable of driving the support in rotation from its straight position to its oblique position, and reciprocally.

14 Claims, 6 Drawing Sheets

CHAIN CONVEYOR CHANGEABLE BETWEEN A STRETCHED CONFIGURATION AND A COMPACT CONFIGURATION

FIELD OF THE INVENTION

The invention relates to the conveying of articles, particularly hollow bodies such as containers, or preforms made of plastic material from which containers are formed, for example by blowing or stretch-blowing.

More specifically, the invention relates to a conveyor for transporting articles such as a chain conveyor that can be changed between a stretched configuration for transporting articles according to a first spacing, and a compact configuration for transporting articles according to a second spacing, which may be smaller than the first.

BACKGROUND

This type of conveyor has long been known for applications in which it is desired to locally decrease the speed of transport of articles without varying the drive speed of the chain.

U.S. Pat. No. 2,487,354 (Anchor Hocking Glass, 1949) describes a conveyor of glass containers intended to locally undergo heat treatment.

Said conveyor is equipped with a chain formed of links, said chain adopting a stretched configuration in a first narrow guide section, in which the links extend in line to form a single row of articles, and a compact configuration in a second wide guide section, in which the links are folded accordion-style to locally form two rows of articles.

In the wide section, the speed of travel of the containers is divided by two; the containers are exposed there to flames from gas jets providing the heat treatment (in this instance, polishing).

The chain circulates in a closed loop on two sprocket wheels, one of which, the drive wheel, is driven in rotation by an endless screw system engaging a pinion integral with the wheel.

The changeover of the chain from its stretched configuration to its compact configuration is accomplished simply by the pivoting of the links in the wide guide section, produced by the thrust of the following links, still located in the narrow guide section,
due to the local decrease in travel speed of the links entering the wide guide section.

Conversely, at the exit of the wide guide section, the links are pulled by the preceding links already located in the narrow guide section, and which have resumed a normal speed of travel.

In this type of conveyor, it has been noted that, beyond a certain threshold speed, instabilities appear in the pivoting movements of the links at the entrance to the wide guide section, due to the increasing amount of deceleration undergone by the links, which results in an increase in the thrust to which the links are subject. Because of their accordion-type disposition, the links exert increasing stress on the lateral surfaces of the wide guide section, in proportion to the thrust that they undergo. This stress generates increased wear of the contact surfaces, and can lead to a slowdown or even jamming of the chain in the wide guide section.

Consequently, this type of conveyor is only suitable for applications where the production rates remain low, typically the polishing of glass containers cited by the aforementioned document U.S. Pat. No. 2,487,354. Moreover, it will be observed that the endless screw drive system does not allow the drive wheel to be made to turn at high speeds.

However, this type of conveyor is not suitable for applications where production rates are high, typically in conveying plastic preforms for manufacturing containers, in which the rates can reach or exceed 50,000 units per hour.

NON-LIMITING OBJECTS OF THE INVENTION

Consequently, one objective is to propose a conveying solution making it possible to transport articles while locally varying the spacing (for example on several rows), which can operate reliably at a high rate.

To that end, a chain conveyor for transporting articles is proposed that can be changed between a stretched configuration for transporting articles according to a first spacing, and a compact configuration for transporting articles according to a second spacing,
the chain being formed from a plurality of articulated links, each link comprising:
- a trolley provided with lateral guide means cooperating with a track defining a predetermined trajectory;
- a support defining an axis of orientation, said support being mounted rotatably with respect to the trolley around a principal axis between a straight position corresponding to the deployed configuration of the chain, and an oblique position, corresponding to the compact position of the chain and in which the axis of orientation is inclined with respect to the straight position, the support having at least one nozzle for the releasable attachment of an article;
- an actuator coupled to the support, suitable for driving said support in rotation from its straight position to its oblique position, and reciprocally.

Thanks to the dissociation between the trolley on the one hand, and the support and actuator on the other hand, it is possible to decrease the mass of the rotatable link, and thus reduce its inertia. The result is a decrease in the stresses induced by the chain on the guide surfaces, and thus a decrease in wear as well as a potential increase in the speed of reduction of the chain, to the benefit of production rates.

Various additional characteristics can be foreseen, alone or in combination:
- the actuator is in the form of a lever integral in rotation with the support, said lever being articulated with respect to the trolley between a withdrawn position corresponding to the straight position of the support, and an offset position corresponding to the oblique position of the support;
- the lever has a cam follower capable of cooperating with a cam track forming a double bend having an entry where the lever is placed in the withdrawn position, and an exit where the lever is placed in the offset position;
- the actuator is mounted at one end of a central shaft rotatable with respect to the trolley, and the support is mounted at an opposite end of the central shaft;
- the nozzle is offset with respect to the principal axis along the axis of orientation;
- each link is connected to the adjacent link by at least one connecting link;
- the trolley comprises a central body, and the lateral guide means are in the form of rollers mounted on lateral guide arms projecting from the body;
- the trolley comprises two diametrically opposite lateral guide arms;
- the support carries at least two nozzles for the releasable attachment of an article on each nozzle;

the support is in the form of a cross bar having a nozzle at each of its ends;

the trolley is provided with vertical guide means cooperating with a support surface;

the trolley comprises a central body, and the vertical guide means are in the form of rollers mounted on vertical guide arms projecting from the body;

the conveyor further comprises a pair of drive wheels on which the chain circulates, said wheels being synchronized in angular position.

BRIEF DESCRIPTION OF THE DRAWINGS

Other objects and advantages of the invention will be seen from the following description of a preferred embodiment, provided with reference to the appended drawings in which.

DETAILED DESCRIPTION OF CERTAIN NON-LIMITING EMBODIMENTS

Figure 1:
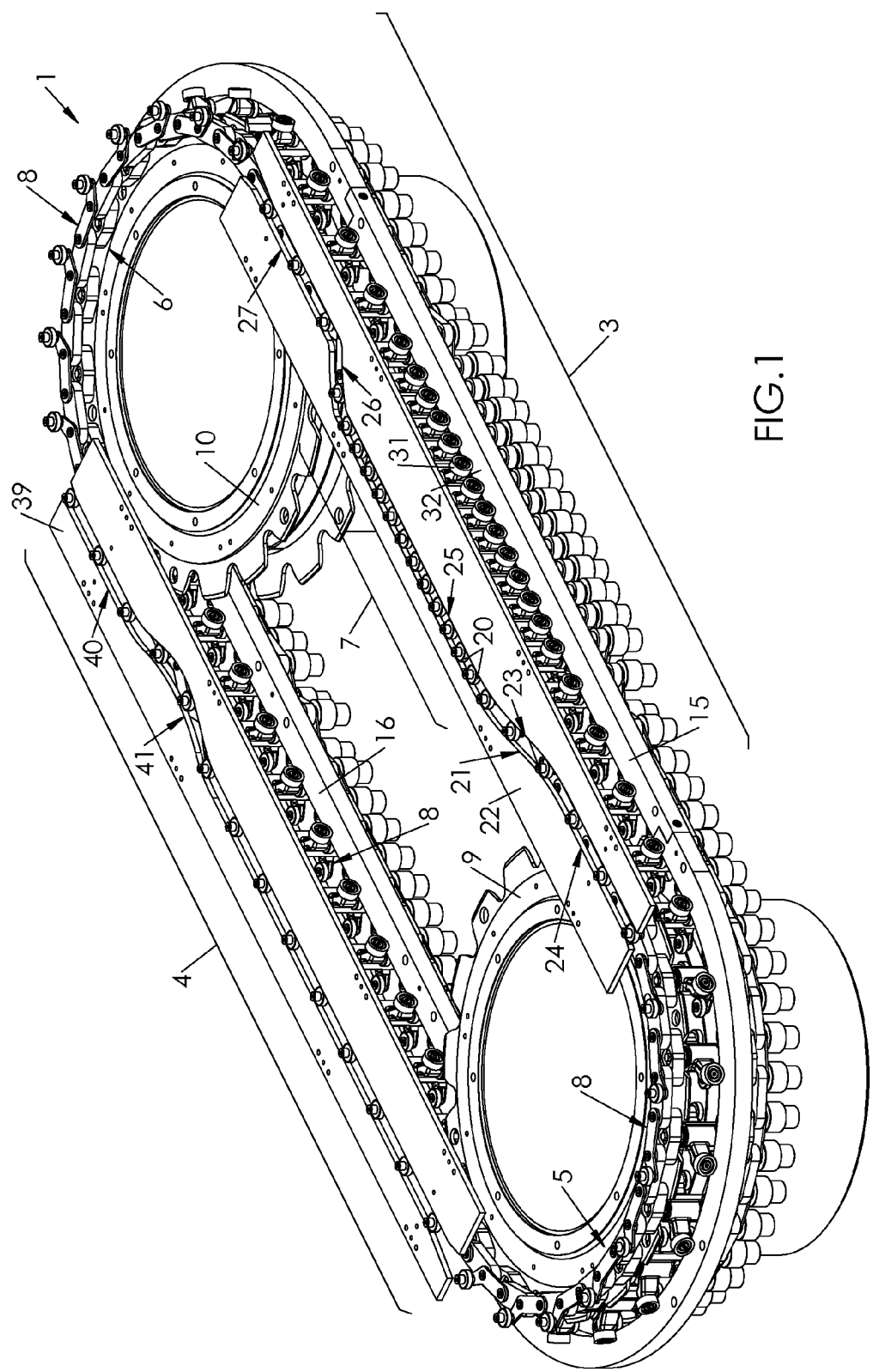
FIG. 1 is a view in perspective showing a conveyor of articles equipped with a chain that can be changed for the local transport of articles in two rows.
Figure 2:
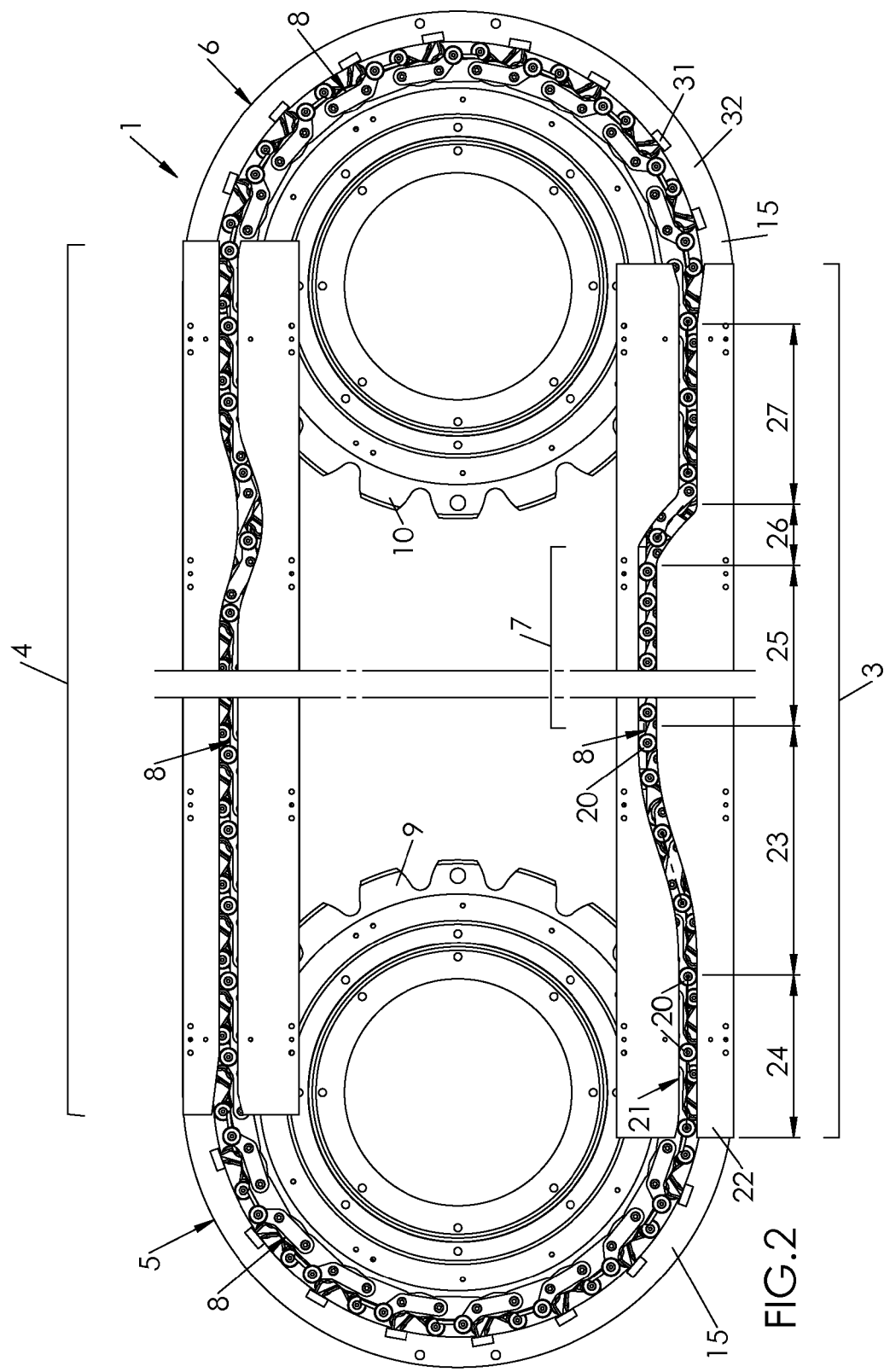
FIG. 2 is a partial top view of the conveyor of FIG. 1.

Represented in FIGS. 1 and 2, respectively in perspective and in top view, is a conveyor 1 of articles 2, particularly hollow bodies, intended to undergo one or more transformation operations along a trajectory defined by the conveyor 1.

Figure 3:
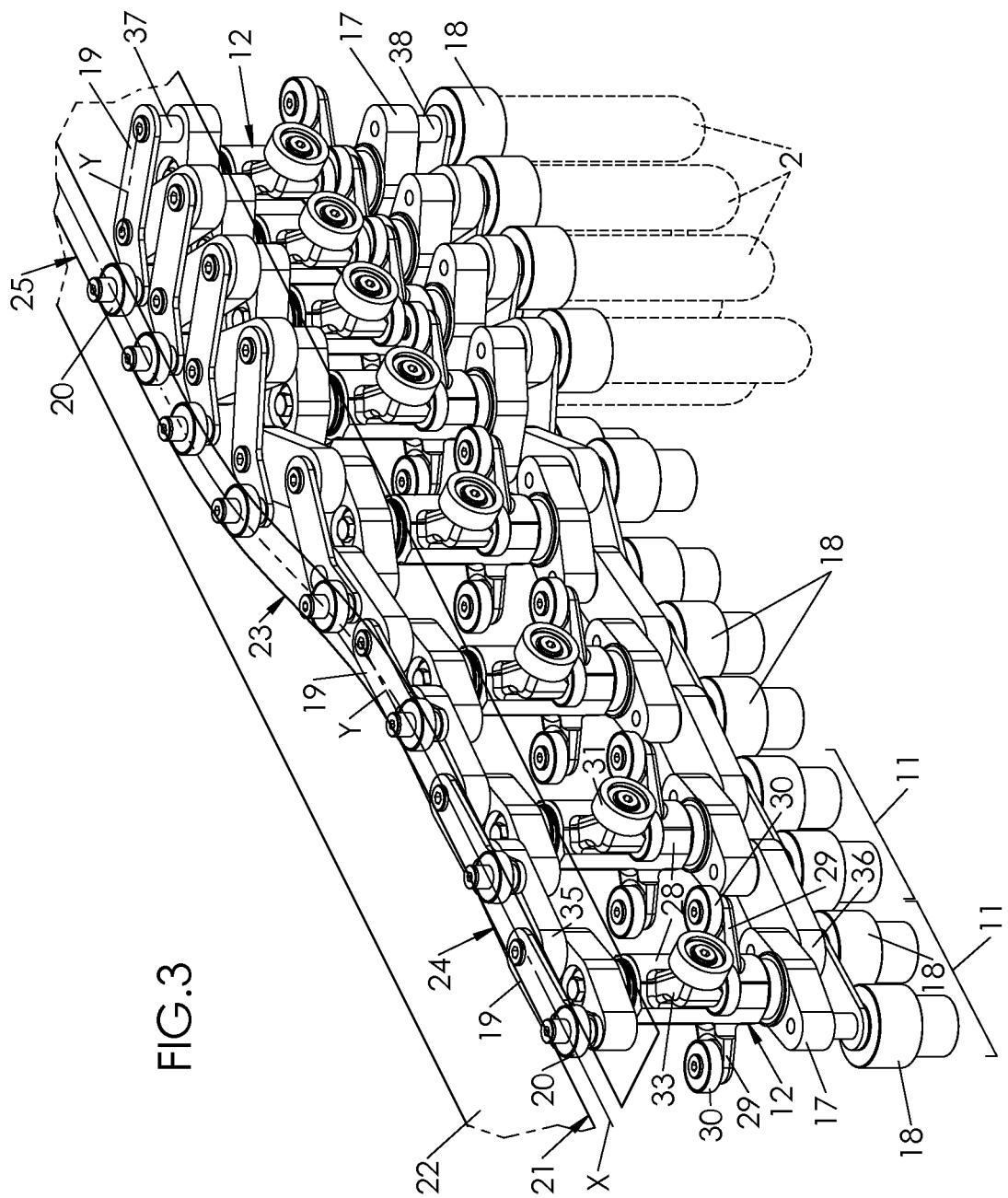
FIG. 3 is a detailed view in perspective showing the process of changing the chain from its stretched configuration to its compact configuration.

As illustrated in FIG. 3, the articles 2 in this instance are preforms of plastic containers produced from an injection molding operation and intended to undergo a heating operation for forming containers in a cavity mold. In the following, it is assumed that the articles 2 are preforms, but this assumption is not limiting.

According to one embodiment, the conveyor 1 is an oblong closed loop with two parallel rectilinear sides, i.e., an advance side 3 and a return side 4, connected by two arc-of-circle returns at the ends of the conveyor 1, i.e., an upstream return 5 and a downstream return 6. However, this form is not limiting.

The advance side 3 defines a longitudinal rectilinear trajectory X along which the preforms 2 are intended to travel. In this instance, the heating operation is intended to be conducted over a functional section 7 extending locally along the advance side 3 of the conveyor 1.

The preforms 2 are picked up by the conveyor 1 from a feed device (not shown) upstream from the functional section 7.

To transport the preforms 2, the conveyor 1 comprises an endless transport chain 8 that is changeable between a stretched configuration for transporting the preforms 2 with a first maximum spacing E1 between them, and a compact configuration for transporting the preforms 2 with a second minimum spacing E2 between them, in this instance less than the first spacing E1, said compact configuration being adopted in the functional section 7 in order to increase the compactness of the preforms 2 during the heating operation.

In the illustrated example, in the stretched configuration of the chain 8, the preforms 2 are aligned in a single row, while in the compact configuration of the chain 8, the preforms 2 are arranged to be staggered in two (or more) rows.

As can be seen in FIGS. 1 and 2, in the returns 5, 6, the chain 8 circulates on drive wheels, i.e., an upstream wheel 9 and a downstream wheel 10, provided with peripheral teeth engaging the chain 8.

The chain 8 is formed from a plurality of links 11 connected to each other and articulated with respect to each other. Each link 11 is configured to be able to carry two preforms 2, and comprises, firstly, a trolley 12 defining a principal axis Z (vertical in this instance), provided with lateral guide means of the link 11.

According to one embodiment illustrated in the figures, and more particularly in FIGS. 5 and 6, said guide means are, for each link 11, in the form of at least one roller (in this instance a pair of rollers, which are described in more detail hereinafter). Each roller cooperates with a lateral guide track 13, 14 defining the travel trajectory of the preforms 2. In the rectilinear sides 3, 4 (particularly in the advance side 3), each lateral guide track 13, 14 is flat. In the returns, each lateral guide track 13, 14 is cylindrical.

In the illustrated example, and as can be seen clearly in FIG. 1, the conveyor 1 comprises a pair of concentric rails 15, 16, the inner faces of which face each other at a mutual constant separation, defining the lateral guide tracks 13, 14 of the chain 8.

Secondly, each link 11 comprises a support 17 defining a movable axis of orientation Y and carrying at least one nozzle 18 for the releasable attachment of a preform 2. According to a preferred embodiment, illustrated in the figures, the nozzle 18 is offset with respect to the principal axis Z along the axis of orientation Y.

Figure 4:
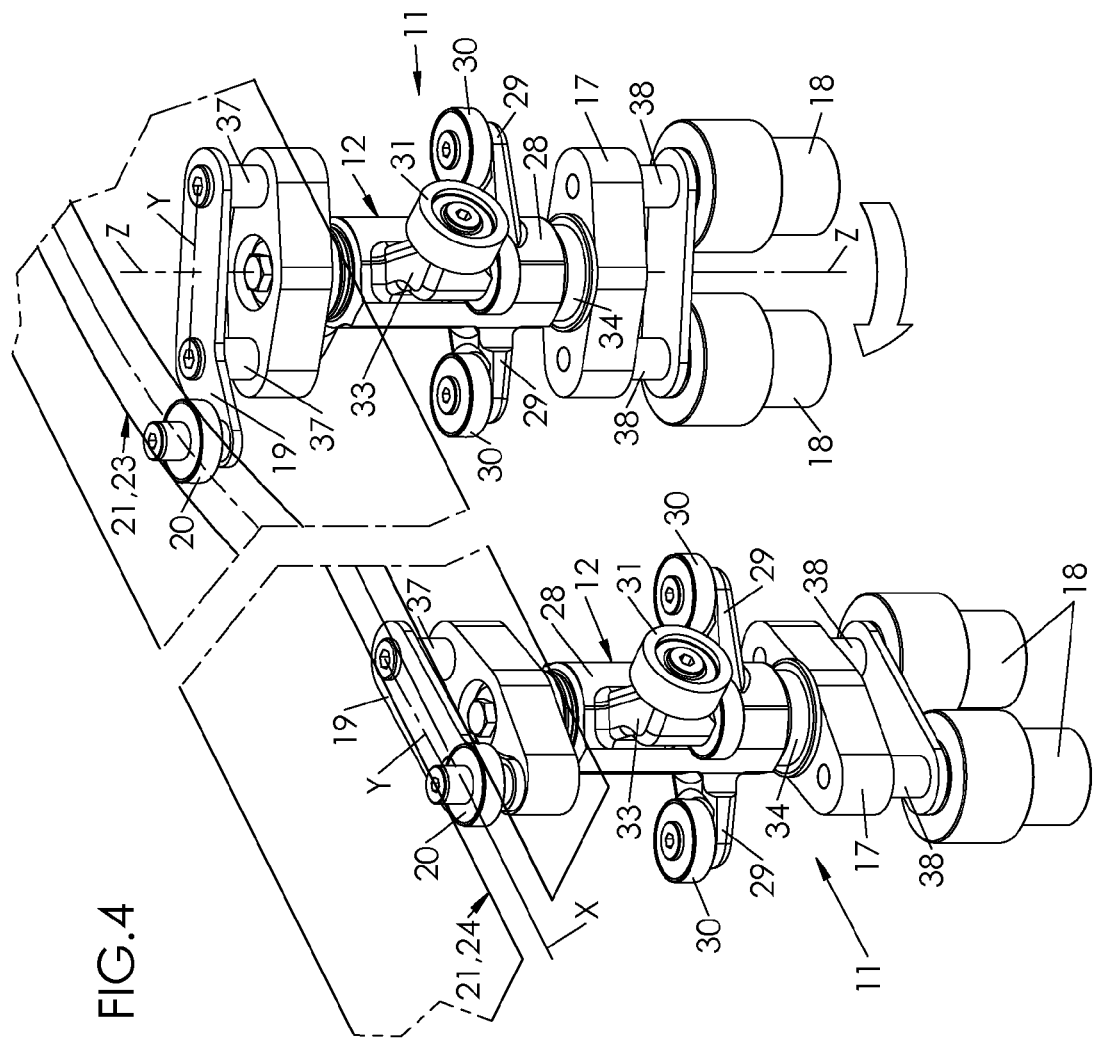
FIG. 4 is a detailed view in perspective showing a link of the chain of FIG. 3 in two positions, i.e., a straight position (at the left of the figure) corresponding to the stretched configuration of the chain, and an oblique position (at the right of the figure) corresponding to the compact configuration of the chain.

The support 17 is mounted rotatably with respect to the trolley 12 around the principal axis Z between:

a straight position, visible at the left of FIGS. 3 and 4, corresponding to the deployed configuration of the chain 8, and in which the axis of orientation Y is collinear to the trajectory X, and an oblique position, visible at the right of FIGS. 3 and 4, corresponding to the compact position of the chain 8 and in which the axis of orientation Y is inclined with respect to its straight position (and thus with respect to the trajectory X).

According to a preferred embodiment illustrated in FIG. 4, the support 17 carries two nozzles 18 aligned on the support along the movable axis Y for the releasable attachment of a preform on each nozzle 18 in a manner that is offset with respect to the central axis Z.

The support 17 is preferably in the form of a cross bar articulated around the central axis Z and carrying a nozzle 18 at each of its ends diametrically opposite with respect to the central axis Z.

Thirdly, the link 11 comprises an actuator 19 coupled to the support 17, suitable for driving said support in rotation from its straight position to its oblique position, and reciprocally.

According to a preferred embodiment illustrated in the figures, the actuator 19 is in the form of a lever integral in rotation with the support 17. Said lever 19 is mounted articulated with respect to the trolley 12 between:

a withdrawn position (visible at the left of FIGS. 3 and 4) corresponding to the straight position of the support 17, and an offset position (visible at the right of FIGS. 3 and 4) corresponding to the oblique position of the support 17.

As represented in detail in FIG. 4, the lever 19 carries at one end a cam follower 20 capable of cooperating with a cam track 21.

According to a preferred embodiment illustrated in the figures, the cam follower 20 is a roller, and the cam track 21 is formed by a central groove made in a plate 22 mounted above the chain 8 along the advance side 3 (FIGS. 1 to 4).

The functional section 7 of the conveyor 1 is defined by a double bend formed by the cam track 21. Said double bend 7 has an entry section 23 where the cam track 21 forms a lateral deviation from a rectilinear upstream section 24 to a rectilinear intermediate section 25 parallel to the upstream section 24 but laterally offset thereto, and an exit section 26 where the cam track 21 forms a return of the rectilinear intermediate section 25 to a rectilinear downstream section 27 collinear to the upstream section 24.

By moving into the entry section 23, the roller 20 is deviated from the upstream section 24 towards the intermediate section 25. The roller 20 thus progressively drives the lever 19 from its straight position to its offset position, and as a result, the support 17 is moved from its straight position to its oblique position, as indicated by the arrow at the right of FIG. 4.

Along the intermediate section 25, the lever 19 is held in the offset position, and the support 17 in its oblique position corresponding to the compact configuration of the chain 8.

Conversely, in the exit section, the roller 20 is deviated from the intermediate section towards the downstream section. The roller 20 thus drives the lever 19 from its offset position towards its straight position, and as a result, the support 17 is moved from its oblique position to its straight position corresponding to the stretched configuration of the chain 8.

According to a preferred embodiment, the wheels 9, 10 are synchronized in angular position, so as to avoid any blockage of the chain in the functional section 7. This synchronization can be performed in different ways. A first technique consists of motorizing the upstream wheel 9, the downstream wheel 10 being slaved. The synchronization of the downstream wheel 10 to the upstream wheel 9 is then performed via the return side 4. A second technique consists of motorizing one of the wheels 9, 10 and coupling them together by means of a transmission (for example by belt or chain). A third technique consists of motorizing both wheels 9, 10 by means of respective electric motors controlled by a single control unit so that said motors (and thus the wheels 9, 10) are synchronized at all times in angular position.

The synchronization of the wheels 9, 10 in angular position makes it possible to evenly distribute the compression stresses exerted on the chain 8 by the upstream wheel 9 in the upstream section 24 and the tensile stresses exerted on the chain 8 in the downstream section 27 by the downstream wheel 10. This minimizes the risks of bridging of the chain in the double band 7 (i.e., in the functional section), and allows a progressive approach of the links 11 to each other, without jolts and jerks, in the intermediate section 25.

According to a preferred embodiment illustrated in FIG. 4, the trolley 12 comprises a central body 28 from which two lateral guide arms 29 project. Each arm 29 carries a lateral guide roller 30 at one end. As can be seen in particular in FIG. 5, the arms 29 are diametrically opposite and extend obliquely with respect to the direction of travel of the chain 8, so as to ensure the dynamic balance of the link 11 during its movement.

Figure 5:
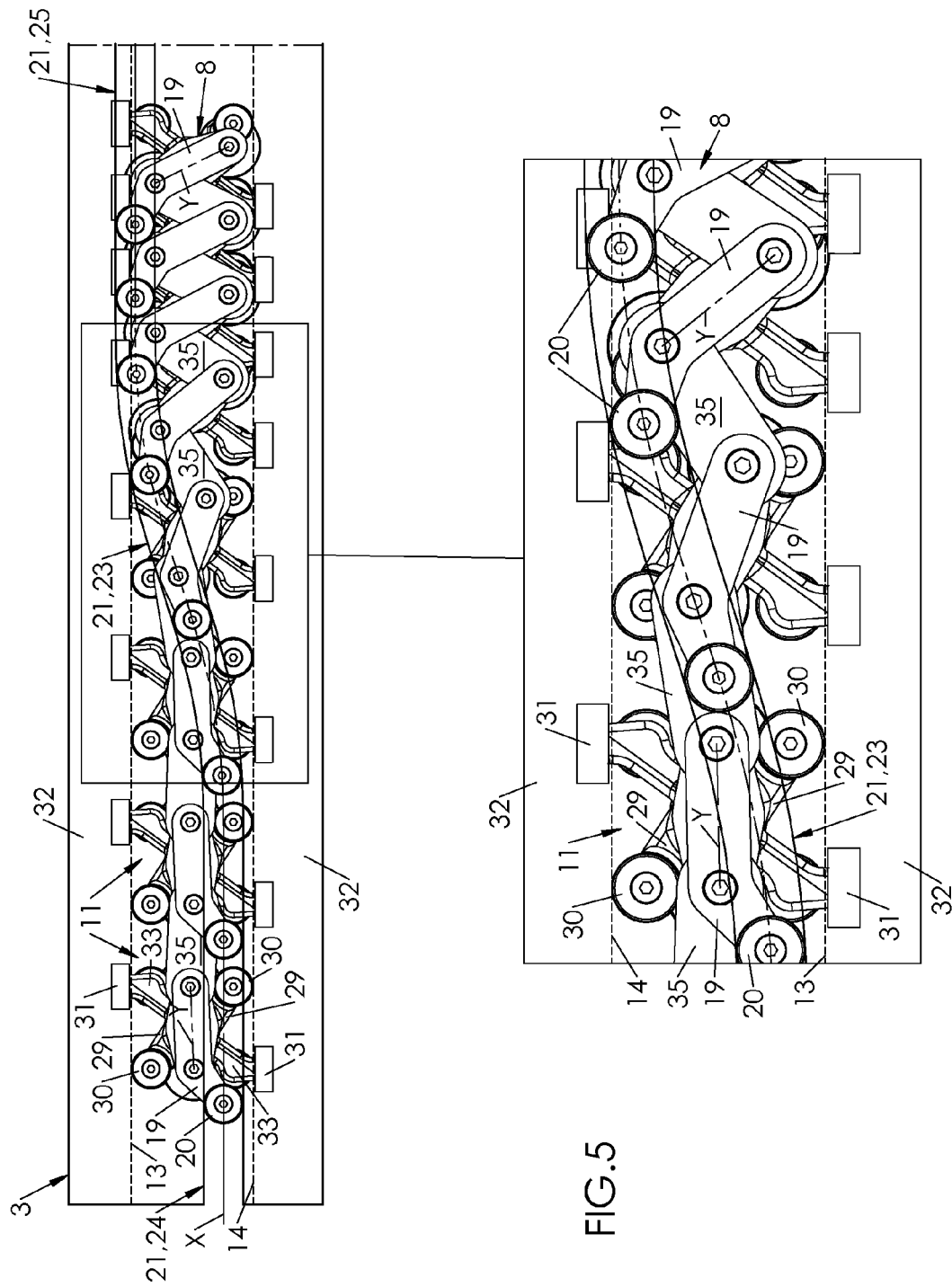
FIG. 5 is a top view of the chain of FIG. 3, with a detail inset in larger scale.

Moreover, and as shown in FIGS. 1 and 5, each link 11 preferably comprises vertical guide means, in this instance in the form of rollers 31 cooperating with a horizontal support surface 32. In the illustrated example, said support surface 32 is formed by the upper faces of the rails 15, 16, on which said vertical guide rollers 31 are supported. As illustrated in FIG. 5, the rollers 31 are carried by arms 33 projecting from the body 28. Said arms 33 are advantageously diametrically opposite and extend obliquely with respect to the direction of travel of the link 11 (and crosswise with respect to the support arms 29 of the lateral guide rollers 30), to ensure the dynamic balance of the link 11. According to a preferred embodiment illustrated in the figures, and more particularly in FIGS. 4 and 6, the arms 33 also carry lateral guide rollers 30; consequently, for each link 11 there are four rollers, thus ensuring that the trolley 12 is completely blocked in rotation along the path X).

To allow the joint rotation of the lever 19 and the support 17, each link 11 comprises, according to a particular embodiment, a central shaft 34 mounted rotatably with respect to the body 28 of the trolley 12. In practice, the central shaft 34, which extends along the principal axis Z of the trolley 12, is rotatably mounted in a bore made in the body 28. As illustrated in FIG. 4, the lever 19 is mounted at the upper end of the shaft 34, and the support 17 at the lower end of the shaft 34. The lever 19 and the support 17 can be secured to the shaft 34 by screws.

Moreover, the coupling of each link 11 to its adjacent links 11 can be accomplished by means of articulated connecting links 35, 36. As illustrated in FIG. 3, each link is preferably connected to each adjacent link by a pair of connecting links 35, 36, i.e., an upper connecting link 35 coupled to the lever 19, and a lower connecting link 36, identical to the upper connecting link 35, and coupled to the support 17.

Specifically, each connecting link 35, 36 is pierced at each of its ends with a cylindrical hole into which is fitted a pin 37, 38 integral with the central shaft 34, respectively at the lever 19 at the upper end of the shaft 34, and at the support 17 at the lower end of the shaft 34.

Figure 6:
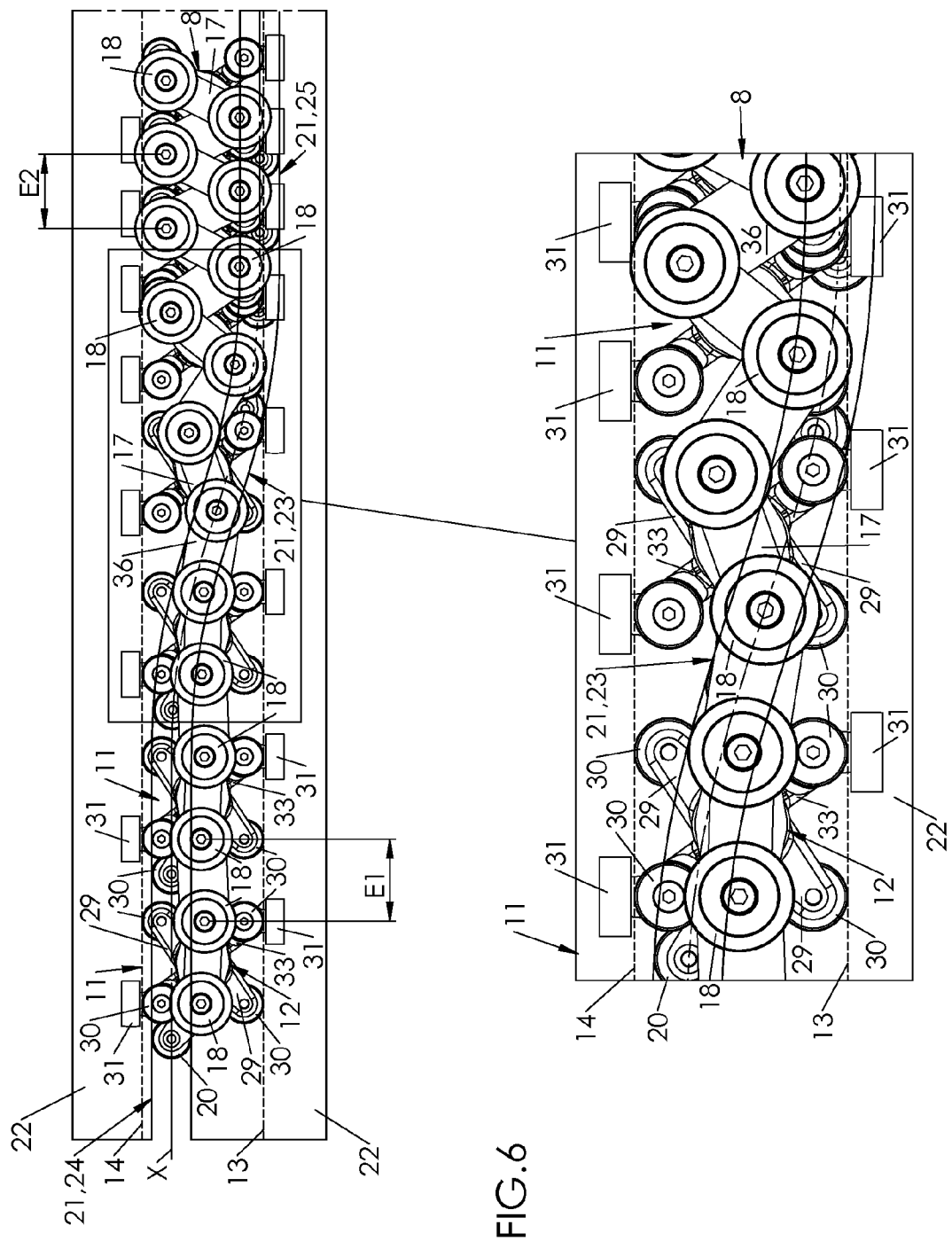
FIG. 6 is a bottom view of the chain of FIG. 3, with a detail inset in larger scale.

Thus, in the stretched configuration of the chain 8, the supports 17 and the connecting links 35, 36 are all aligned, as illustrated at the left of FIGS. 3, 5 and 6, while in the compact configuration of the chain 8, the supports 17 and the connecting links 35, 36 extend accordion-style, as illustrated at the right of these same figures.

In order to maintain the chain 8 under tension, it is possible to provide for the adjustment of the center-to-center distance between the wheels 9, 10. However, according to a preferred embodiment illustrated in FIGS. 1 and 2, the conveyor 1 is equipped with a slack adjustment system in the form of a plate 39 provided with a groove 40 defining an essentially rectilinear return cam track with which the rollers 20 of the links 11 cooperate along the return side 4, and having, at the exit from the downstream wheel 10, a local double bend 41, which is small in extension, the purpose of which is to locally decrease the separation between the links 11 and thus place the chain 8 under tension.

The conveyor 1 operates in the following manner.

In the returns 5, 6 (i.e., on the periphery of the wheels 9, 10), along the return side 3, and up to the upstream section 24 of the advance side 3, the chain 8 extends in its stretched configuration, in which the nozzles 18 carrying the preforms 2 extend in alignment with each other in a single row, and in which the separation between the nozzles 18 of two successive links 11 corresponds to the maximum separation E1 between the preforms 2.

When the links 11 reach the entrance of the functional section 7, the levers 19 are offset by the entry section 23 of the cam track 21 towards the intermediate section 25, which causes the supports 17 to pivot towards their oblique position. In the intermediate section 25, the chain 8 extends in its compact configuration, in which the levers 19 (with the supports 17) and the connecting links 35, 36 extend accordion-style (at the right of FIGS. 5 and 6), the nozzles 18 carrying the preforms 2 are staggered in two parallel rows, and the separation between the nozzles 18 of two successive links 11 corresponds to the minimum separation E2 between the preforms 2.

When the links 11 reach the exit of the functional section 7, the levers 19 are returned by the exit section 26 of the cam track 21 to their withdrawn position, and the chain 8 resumes its stretched configuration when the links 11 are engaged in the downstream section 27.

As can be clearly seen in FIGS. 3 to 6, the orientation of the trolley 12 is invariant. In particular, the orientation of the trolley 12 is constant in the advance section 3 between the upstream section 24 and the downstream section 27, the lateral guide paths 13, 14 remaining flat all along the advance side 3. Only the lever 19 and the support 17 undergo rotation, resulting in the compacting of the chain 8 in the intermediate section 25.

The conveyor 1 that has just been described has the following advantages.

First, thanks to the lateral guide of the link 11, which maintains the trolley 12 in a constant orientation, the stresses exerted by the trolley on the lateral guide paths 13, 14 are substantially constant all along the advance side, including in the functional section 7 and in particular along the entry section 23 and the exit section 26. Furthermore, this makes it possible to decrease the rotatable mass of each link 11, and thus reduce the inertia thereof.

The movement of the chain 8 is therefore without jolts and jerks, and it is possible to cause it to circulate at high speeds, which enables high production rates, required particularly by the bottling industry, while at the same time improving the general reliability of the conveyor 1 and decreasing the wear of parts in contact with each other.

Secondly, thanks to the synchronization of the wheels, the conveyor has increased sturdiness, the risks of bridging of the chain 8 in the double bend 7 being minimized.

Thirdly, the conveyor 8 has increased flexibility: it is only necessary to modify the profile of the cam track 21 at the double bend 7 to vary the minimum separation E2 and thus adapt the conveyor 8 to other sizes of preforms 2 corresponding to containers of different capacity.

The description that has just been provided of a particular embodiment does not exclude variants of embodiment.

In particular, the actuator 19 of the link 11 could be in forms other than a lever. In a first variant, the actuator could thus be in the form of a sprocket wheel locally engaging a rack at the entrance and exit of the functional section 7. In a second variant, the actuator could be a magnetic rocker arm, the conveyor 1 then comprising electromagnets disposed appropriately to cause the actuator to change over from a position corresponding to the stretched configuration of the chain 8 to a position corresponding to the compact configuration thereof.

The invention claimed is:

1. A chain conveyor for transporting articles with a chain that can be changed between a stretched configuration for transporting articles according to a first maximum spacing, and a compact configuration for transporting articles according to a second minimum spacing, the chain being formed from a plurality of articulated links the chain conveyor having an oblong closed loop with a rectilinear advance side parallel to a return side, the advance side defining a longitudinal rectilinear trajectory for the articles, wherein each link comprises:
   a trolley provided with lateral guide rollers cooperating with a track defining a predetermined trajectory of the articles;
   a support defining an axis of orientation, said support being mounted rotatably with respect to the trolley around a principal axis between a straight position corresponding to the stretched configuration of the chain and in which the axis of orientation is collinear to the trajectory, and an oblique position, corresponding to the compact configuration of the chain and in which the axis of orientation is inclined with respect to the straight position and thus with respect to the trajectory, the support having at least one nozzle for the releasable attachment of an article;
   an actuator coupled to the support, suitable for driving said support in rotation from the straight position to the oblique position, and reciprocally.

2. The chain conveyor according to claim 1, wherein the actuator is in the form of a lever integral in rotation with the support, said lever being articulated with respect to the trolley between a withdrawn position corresponding to the straight position of the support, and an offset position corresponding to the oblique position of the support.

3. The chain conveyor according to claim 2, wherein the lever has a cam follower capable of cooperating with a cam track forming a double bend having an entry where the lever is placed in the offset position, and an exit where the lever is returned to the withdrawn position.

4. The chain conveyor according to claim 1, wherein the actuator is mounted at one end of a central shaft rotatable with respect to the trolley, the support being mounted at an opposite end of the central shaft.

5. The chain conveyor according to claim 1, wherein each nozzle is offset with respect to the principal axis along the axis of orientation.

6. The chain conveyor according to claim 1, wherein each link is connected to the adjacent link by at least one connecting link.

7. The chain conveyor according to claim 1, wherein the trolley comprises a central body, and the lateral guide rollers are mounted on lateral guide arms projecting from the body.

8. The chain conveyor according to claim 7, wherein the trolley comprises two diametrically opposite lateral guide arms.

9. The chain conveyor according to claim 1, wherein the support carries at least two nozzles for the releasable attachment of an article on each nozzle.

10. The chain conveyor according to claim 9, wherein the support is in the form of a cross bar having a nozzle at each of its ends.

11. The chain conveyor according to claim 1, wherein the trolley is provided with vertical guide rollers cooperating with a support surface.

12. The chain conveyor according to claim 11, wherein the trolley comprises a central body, and the vertical guide rollers are mounted on vertical guide arms projecting from the body.

13. The chain conveyor according to claim 1, further comprising a pair of drive wheels on which the chain circulates, said wheels being synchronized in angular position.

14. A chain conveyor for transporting articles, comprising:
a chain configured to be changed between a stretched configuration for transporting articles according to a first maximum spacing, and a compact configuration for transporting articles according to a second minimum spacing, the chain formed from a plurality of articulated links, the chain conveyor having an oblong closed loop with a rectilinear advance side parallel to a return side, the advance side defining a longitudinal rectilinear trajectory for the articles;
wherein each link comprises:
a trolley provided with a lateral guide cooperating with a track defining a predetermined trajectory of the articles;
a support defining an axis of orientation, the support being mounted rotatably with respect to the trolley around a principal axis between a straight position corresponding to the stretched configuration of the chain and in which the axis of orientation is collinear to the trajectory, and an oblique position, corresponding to the compact configuration of the chain and in which the axis of orientation is inclined with respect to the straight position and thus with respect to the trajectory, the support having at least one nozzle for the releasable attachment of an article; and
an actuator coupled to the support, suitable for driving said support in rotation from the straight position to the oblique position, and reciprocally.

\* \* \* \* \*